No. 766,163. PATENTED AUG. 2, 1904.
H. E. BRADLEY.
WIND STACKER.
APPLICATION FILED FEB. 9, 1904.
NO MODEL.

WITNESSES.
INVENTOR
HERBERT E. BRADLEY.
BY
HIS ATTORNEYS.

No. 766,163. Patented August 2, 1904.

UNITED STATES PATENT OFFICE.

HERBERT E. BRADLEY, OF LAMOURE, NORTH DAKOTA.

WIND-STACKER.

SPECIFICATION forming part of Letters Patent No. 766,163, dated August 2, 1904.

Application filed February 9, 1904. Serial No. 192,750. (No model.)

*To all whom it may concern:*

Be it known that I, HERBERT E. BRADLEY, of Lamoure, Lamoure county, North Dakota, have invented certain new and useful Improvements in Wind-Stackers, of which the following is a specification.

My invention relates to that class of stackers wherein a blast-fan is utilized to remove the threshed straw from the separator; and the object of my invention is to provide an apparatus that is easily operated, more compact than devices of this kind in general use, and better adapted for the purpose designed.

My invention consists generally in arranging the blast-fan above the rear of the separator and providing a downwardly-inclined throat for the air-blast and feeding the straw into the current from the under side, the chaff being drawn from the rear of the shoe through suction-pipes into the fan-casing.

Figure 1:
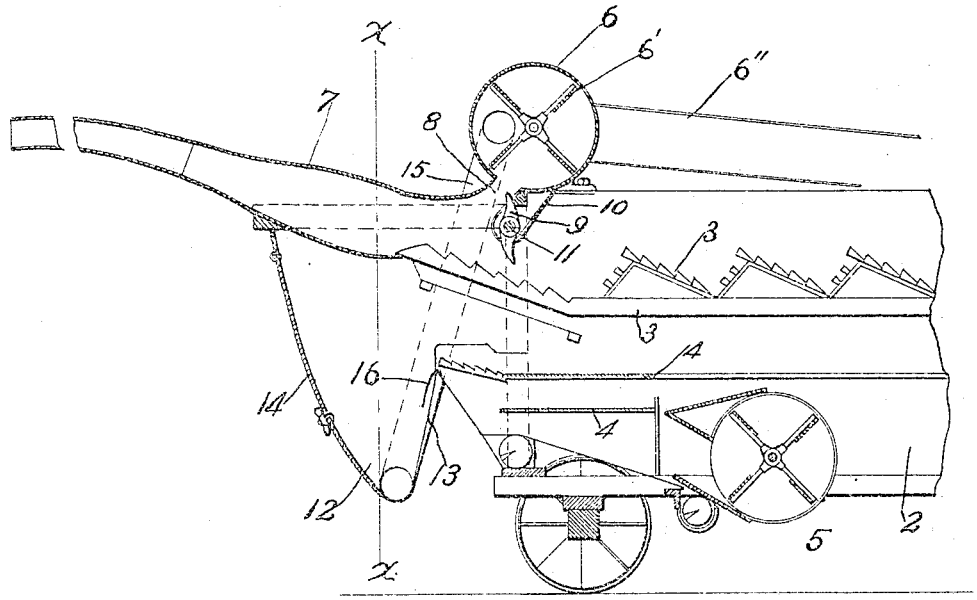
Figure 2:
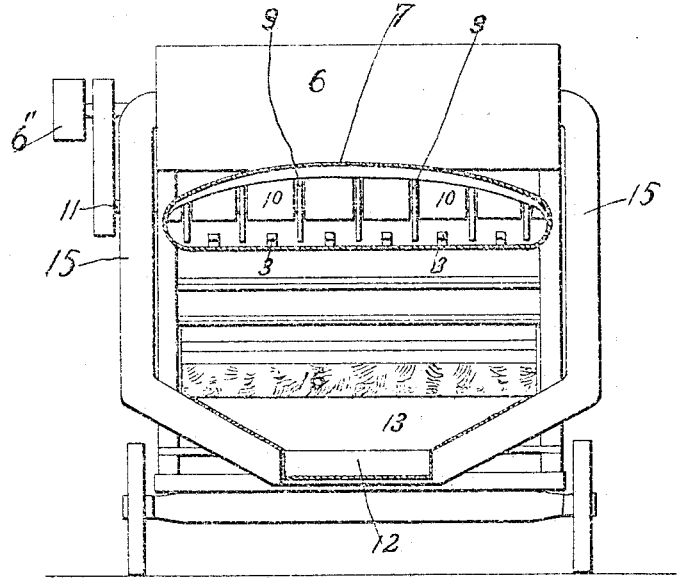

In the accompanying drawings, forming part of this specification, Figure 1 is a vertical section of the rear end of a separator with my invention applied thereto. Fig. 2 is a transverse vertical section on the line *x x* of Fig. 1 looking into the rear of the machine.

In the drawings, 2 represents the rear end of a separator of the ordinary type having a straw-rack 3, sieves 4, and a blast-fan 5 of ordinary construction and arranged in the usual way. Upon the rear end of the separator above the straw-rack I arrange a fan-casing 6, that communicates with a stacker-tube 7 through a throat 8, that enters the upper side of the tube obliquely with respect thereto. A blast-fan 6' is provided within the casing 6, driven by a belt 6". Beneath this throat above the straw-rack I provide a feed device consisting of a series of fingers 9, arranged between guards 10 upon a shaft 11. These fingers engage the stream of straw and feed it back into the current of air that enters the tube through the throat 8.

Below the inner end of the stacker-tube and the discharge end of the straw-rack and sieves I provide a hopper 12, having a wall 13, that extends up to the sieve-shoe on one side and on the other provided with a hinged gate 14, through which access may be had to the sieves and the straw-rack. The bottom of the hopper is connected on each side with the ends of the fan-casing 6 by suction-tubes 15, through which the chaff and refuse material are drawn up into the fan-casing and discharged therethrough into the throat 8 and the moving stream of straw. A canvas apron 16 is provided on the sieve-shoe overhanging the inner wall of the hopper to prevent the chaff and refuse material from working down between them.

The operation of my improved wind-stacker is as follows: The machine having been set in motion the beater fingers or arms are revolved to feed the straw into the stacker-tube and the blast-fan is operated at the proper speed to create sufficient suction through the pipes 15 to draw up the chaff and refuse material from the hopper into the fan-casing and discharge it upon the stream of straw, which, entering the current from the under side, will be driven through the stacker-tube to the stack.

I claim as my invention—

1. The combination, with a separator, of a stacker-tube and blast-fan located above the said tube and having a discharge passage or throat leading thereinto, means for feeding straw into said tube beneath said passage, a hopper provided beneath said tube in position to receive the chaff from the sieves, and a suction-pipe leading from said hopper to said fan.

2. The combination, with a separator and its straw-rack and sieves, of a stacker-tube, a casing mounted on said separator above said tube and having a discharge-passage leading obliquely therein, a blast-fan operating in said casing, means for feeding straw into said tube and into the air-current discharged through said passage, a hopper arranged to receive the chaff from said sieves, and suction-pipes provided on each side of said hopper and communicating with the end of said fan-casing.

3. The combination, with a separator, of a stacker-tube, a blast-fan having a discharge throat or passage leading into the upper side of said tube obliquely with respect thereto, a chaff-receptacle, and a suction-pipe leading from said receptacle to said fan.

4. The combination, with a separator, having a straw-rack and sieves, of a stacker-tube arranged to receive the straw from said rack, a fan-casing and fan arranged above the receiving end of said tube and having an inclined discharge-passage leading therein, and straw-feeding means provided near said tube and passage.

5. The combination, with a separator and its straw-rack and sieves, of a stacker-tube, a fan-casing above said tube having a passage leading therein, a fan, and suction-pipes communicating with the discharge end of said sieves and with said casing.

In witness whereof I have hereunto set my hand this 30th day of January, 1904.

HERBERT E. BRADLEY.

In presence of—
H. D. MACK,
JOHN M. BOTTS.